Patented Aug. 6, 1940

2,210,564

UNITED STATES PATENT OFFICE 2,210,564

PRODUCTION OF ALKYL HALIDES

Leonid Andrussow, Mannheim, and Gerhard Stein, Ludwigshafen-on-the-Rhine, Germany, assignors, by mesne assignments, to General Aniline & Film Corporation, New York, N. Y., a corporation of Delaware No Drawing. Original application December 10, 1935, Serial No. 53,714. Divided and this application December 31, 1937, Serial No. 182,794. In Germany January 17, 1935

6 Claims. (Cl. 260—486)

The present invention relates to the manufacture and production of alkyl halides. This application has been divided out from our copending application Ser. No. 53,714, filed December 10, 1935.

We have found that alkyl halides and unsaturated organic compounds can simultaneously be obtained in a manner which is very advantageous industrially by treating organic halogenated aliphatic carboxylic acids, nitriles or esters which contain in the molecule at least one halogen atom and one hydrogen atom attached to two adjacent carbon atoms with aliphatic alcohols and/or ethers at elevated temperature in the presence of a catalyst.

As halogen compounds of the said kind suitable as starting materials there may be mentioned practically all halogenated aliphatic carboxylic acids, nitriles and esters in which the halogen atoms are aliphatically combined and there may be employed not only mono halogenated aliphatic carboxylic acids, nitriles or esters but also those which contain two or more halogen atoms. For example there may be mentioned alpha- and beta-chlorpropionic acid, chlorpropionic nitrile, chlorpropionic acid methyl ester.

Suitable alcohols or ethers are for example the aliphatic, alicyclic and aliphatic-aromatic alcohols and/or their ethers as for example methyl, ethyl, propyl, butyl, isopropyl, isobutyl and benzyl alcohol or glycols and any ethers derived from the same. Ethers of such alcohols, as for example of vinyl alcohol, which are not stable in the free state may be employed according to this invention. If mixed ethers be employed instead of simple ethers, corresponding mixtures of alkyl halides are obtained.

The reaction is liable to proceed according to the equations which are given by way of example:

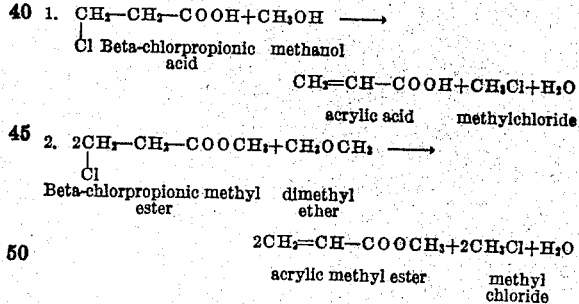

The catalysts employed in the present process may be chosen from the group consisting of difficultly reducible oxides and salts. Specially suitable for this purpose are catalysts having a hydrating or dehydrating action. As catalysts of the said kind there may be mentioned oxides of barium, zinc, aluminium, silicon, titanium, zirconium, thorium, aluminium sulphate, phosphates of aluminium, iron, cerium, bismuth, silver, and uranium, also zinc tungstate or zinc chromate, they may be employed in admixture with one another or deposited on carriers. In some cases the catalysts are particularly active in a peptized state or in the form of gels.

Generally speaking the reaction may be carried out at any desired pressure. If the alcohols and/or ethers used tend to form olefines, this tendency may be suppressed by using increased pressure. In this case pressures of up to about 50 atmospheres, advantageously up to about 20 atmospheres are employed. Pressures amounting to 100 atmospheres may however be applied as well. The process is carried out at temperatures between 150° and 500° C. advantageously between 250° and 350° C. The most favorable temperatures lie between 260° and 320° C. In some cases it is preferable to employ one of the initial materials in excess, especially when working in a cycle.

The reaction usually proceeds in a practically quantitative manner. In most cases, as for example in the formation of methyl chloride, the reaction products may be very readily separated from each other.

As compared to the process so far employed for the manufacture of alkyl halides the process according to the present invention presents valuable advantages. Thus, for example, in the usual chlorination of methane to methyl chloride and methylene chloride, as well as in other direct chlorinations of aliphatic compounds chloroform and carbon tetrachloride are formed. When producing alkyl halides in accordance with the present process, however, chloroform and carbon tetrachloride in general are not obtained. This process allows to produce alkyl halides in an advantageous manner, valuable unsaturated compounds being simultaneously formed. Thus, the halogen split off from the saturated halogen compounds employed as starting materials is obtained not in the form of inorganic salts of only slight value but it is simultaneously rendered useful for the formation of industrially valuable alkyl halides. Organic halogen compounds which as acids, esters, ketones or aldehydes cannot withstand unchanged a treatment with alkalies, can thus be easily converted into the corresponding unsaturated compounds.

The alkyl halides obtained in the said manner as well as the unsaturated compounds may be employed as intermediate products for the preparation of dyestuffs, assistants for the textile and related industries and artificial compositions.

The following examples will further illustrate how our said invention is carried out in practice, but the invention is not restricted to these examples.

Example 1

A mixture of 1 molecular proportion of beta-chlorpropionic acid and 1 molecular proportion of methanol is vaporized and led over aluminium oxide at 300° C. Acrylic acid and methyl chloride are formed in very good yields. Instead of aluminium oxide, thorium oxide may be used as the catalyst.

Example 2

A mixture of equivalent amounts of beta-chlorpropionic acid methyl ester and dimethyl ether is led in the vapor phase over aluminium oxide at 290° C. Acrylic acid methyl ester and methyl chloride are thus obtained in good yields.

Example 3

A vaporous mixture of equivalent amounts of alpha-chlorpropionic nitrile and methanol is led over aluminium oxide at 300° C. A mixture of acrylic nitrile and methyl chloride is thus formed in good yields.

What we claim is:

1. The process for the production of alkyl halides and unsaturated organic compounds which comprises reacting oxygen compounds of the class consisting of aliphatic alcohols and ethers with organic halogen compounds selected from the class consisting of aliphatic carboxylic acids and carboxylic acid esters and which contain in the molecule at least one halogen atom and one hydrogen atom attached to two adjacent carbon atoms at from 150 to 500° C. in the presence of a solid, dehydrating catalyst.

2. The process for the production of alkyl halides and unsaturated organic compounds which comprises reacting oxygen compounds of the class consisting of aliphatic alcohols and ethers with organic halogen compounds selected from the class consisting of aliphatic carboxylic acids and carboxylic acid esters and which contain in the molecule at least one halogen atom and one hydrogen atom attached to two adjacent carbon atoms at from 250 to 350° C. in the presence of a solid, dehydrating catalyst.

3. The process for the production of alkyl halides and unsaturated organic compounds which comprises reacting oxygen compounds of the class consisting of aliphatic alcohols and ethers with organic halogen compounds selected from the class consisting of aliphatic carboxylic acids and carboxylic acid esters and which contain in the molecule at least one halogen atom and one hydrogen atom attached to two adjacent carbon atoms at from 150 to 500° C. in the presence of a solid, dehydrating catalyst, increased pressure being employed.

4. The process for the production of alkyl halides and unsaturated organic compounds which comprises reacting oxygen compounds of the class consisting of aliphatic alcohols and ethers with halogenated fatty acids which contain in the molecule at least one halogen atom and one hydrogen atom attached to two adjacent carbon atoms at from 150 to 500° C. in the presence of a solid, dehydrating catalyst.

5. The process for the production of alkyl halides and unsaturated organic compounds which comprises reacting oxygen compounds of the class consisting of aliphatic alcohols and ethers with beta-chlorpropionic acid at from 150° to 500° C. in the presence of a solid, dehydrating catalyst.

6. The process for the production of alkyl halides and unsaturated organic compounds which comprises reacting oxygen compounds of the class consisting of aliphatic alcohols and ethers with beta-chlorpropionic acid methyl ester at from 150° to 500° C. in the presence of a solid, dehydrating catalyst.

LEONID ANDRUSSOW.
GERHARD STEIN.